Feb. 1, 1966     I. STOLLMAN     3,231,926
GROCERY CART CASTER

Filed Jan. 16, 1963     2 Sheets-Sheet 1

INVENTORS
IRVING STOLLMAN,
BY   ROBERT H. GODWIN and
JOHN A. SKUPAS

Lockwood, Woodard, Smith & Weikart
Attorneys

Feb. 1, 1966  I. STOLLMAN  3,231,926
GROCERY CART CASTER
Filed Jan. 16, 1963  2 Sheets-Sheet 2

INVENTORS
IRVING STOLLMAN,
BY  ROBERT H. GODWIN and
JOHN A. SKUPAS

Lockwood, Woodard, Smith & Weikart
Attorneys 3,231,926
GROCERY CART CASTER
Irving Stollman, Robert H. Godwin, and John A. Skupas, Evansville, Ind., assignors, by mesne assignments, to Bliss & Laughlin Industries Incorporated, a corporation of Delaware
Filed Jan. 16, 1963, Ser. No. 251,855
3 Claims. (Cl. 16—22)

The present invention relates to a caster arrangement particularly adapted for use in grocery carts and in other applications where the caster is subjected to excessive vibration and shock.

Swivel-type casters are used in a variety of applications which involve tremendous vibration and shock. For example, grocery carts incorporating such casters are frequently "trained" in groups of ten or more by the shopping center clerks for movement in a chain from one area of the shopping center to another. The surface passed over by the carts includes curbs and other impediments over which the carts move by inertia. That is, the clerk nests the carts together and manages to get the carts over curbs and impediments by maintaining the carts at a relatively high rate of speed.

Also, grocery carts are subjected to great dynamic stress by the customers themselves who fill them with heavy loads and push them, for example, over bumps to their automobiles in the parking lot. Conventional casters, when subjected to the above dynamic stresses, are damaged in that brinelling of the raceways by the raceway balls is produced.

Consequently, one object of the present invention is to provide a swivel-type caster arrangement capable of withstanding great dynamic stresses particularly those exerted axially of the swivel.

Another object of the invention is to provide an improved grocery cart swivel caster.

Related objects and advantages will become apparent as the description proceeds.

The full nature of the invention will be understood from the accompanying drawings and the following description and claims:

Figure 1:
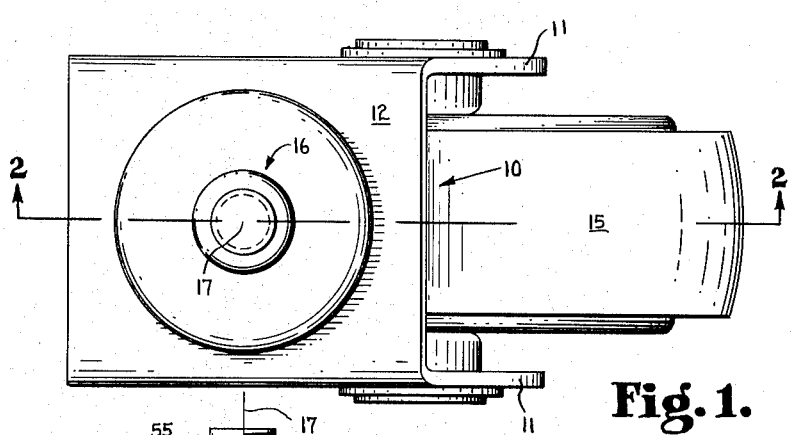
FIG. 1 is a top plan view of a swivel type caster assembly incorporating the present invention.
Figure 2:
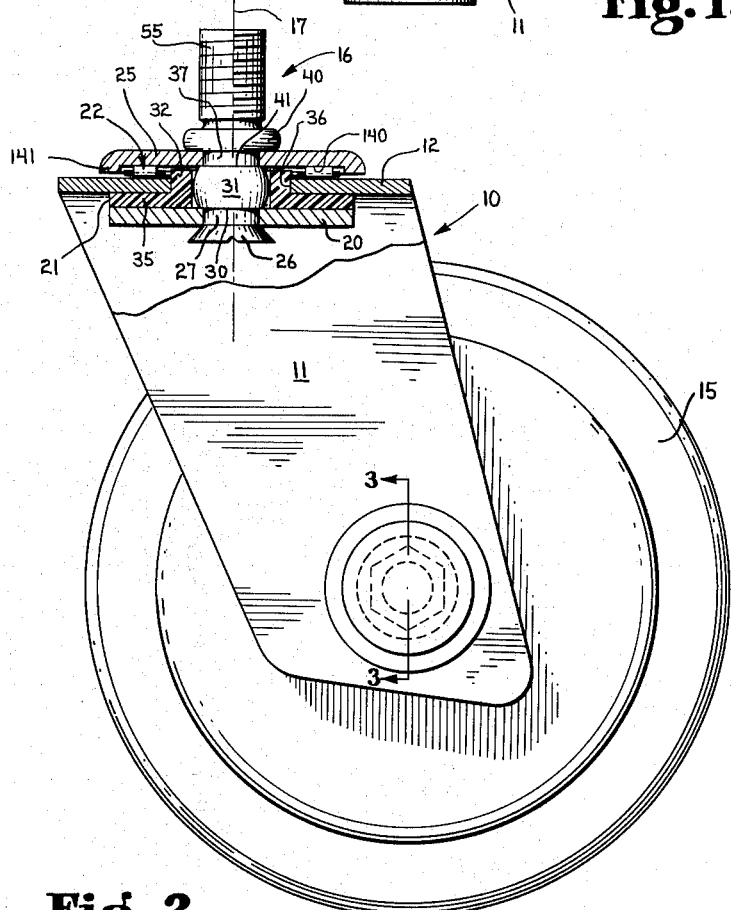
FIG. 2 is partially a side elevation of the structure illustrated in FIG. 1 and partially a vertical section taken along the line 2—2 of FIG. 1 in the direction of the arrows.

Referring now more particularly to the drawings, there is illustrated a horn 10 including spaced parallel side portions 11 joined by a horizontal transverse portion 12. The side portions 11 rotatably mount in conventional manner a wheel 15 therebetween.

The horn 10 is swivel mounted upon a kingpin 16 for rotation about the axis 17 of the kingpin. The swivel mounting of the horn upon the kingpin is accomplished by means of a lower bearing retainer or plate 20, a lower bearing 21, a roller bearing assembly 22 and an upper retainer 25.

At the lower end of the kingpin 16, there is formed a staked head 26 upon which is supported the lower retainer 20 which is a flat, annular, rigid disc preferably formed of steel or the like. The plate or disc 20 is received about a first cylindrical portion 27 of the kingpin and is retained between the head 26 and a shoulder 30 on an enlarged portion 31 of the kingpin.

Supported upon the rigid retainer 20 is the flat, annular bearing 21 which is preferably composed of a commercially available plastic bearing material such as, for example, that known by the trademark Celcon. The bearing 21 has formed at its central portion a raised collar 32 which has a dimension axially of the kingpin almost as great as the axial dimension of the enlarged portion 31. The horn 10 and particularly the transverse horizontal portion 12 thereof is received about the collar 32 and is supported upon the upper surface of the flat radially extending portion 35 of the bearing 21. The horn 10 is rotatable relative to the bearing 21 and is provided with a suitable cylindrical opening 36 through which projects the collar 32.

The kingpin 16 further includes a second cylindrical portion 37 which extends between an enlarged portion 40 and a shoulder 41 formed on the enlarged portion 31. The upper bearing retainer 25 is retained in position between the enlarged portions 40 and 31 and surrounds the cylindrical portion 37 which has the same diameter as the cylindrical portion 27.

Figure 5:
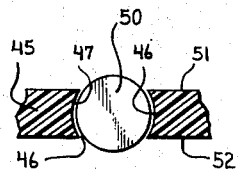
FIG. 5 is a section taken along the line 5—5 of FIG. 4 in the direction of the arrows and drawn to an enlarged scale.
Figure 4:
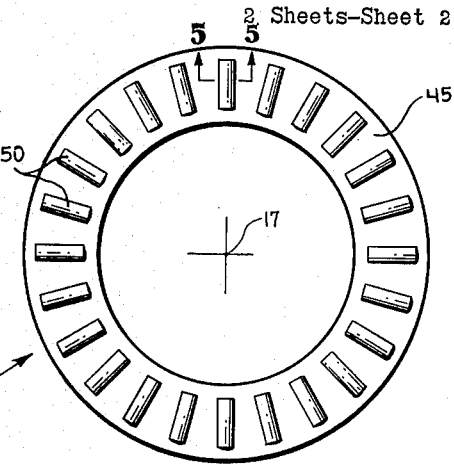
FIG. 4 is a plan view drawn to an enlarged scale of a bearing assembly making up a part of the structure of FIGS. 1–3.
Figure 3:
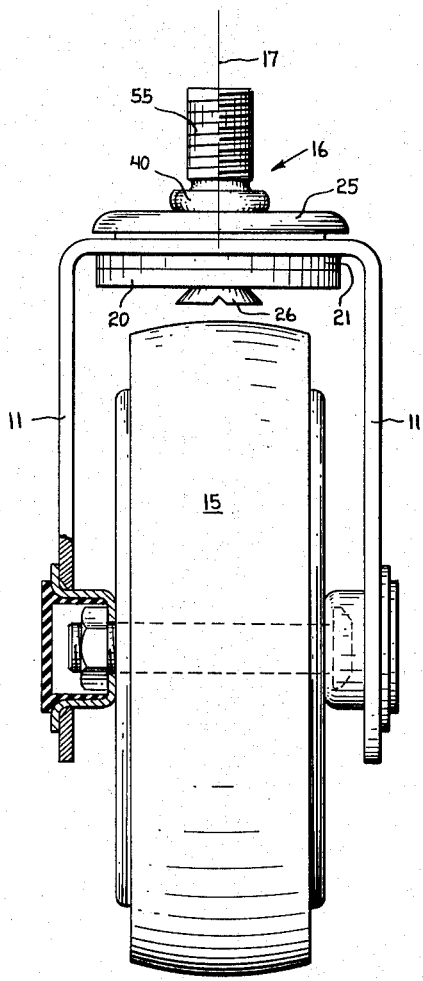
FIG. 3 is primarily an end elevation of the structure of FIGS. 1 and 2 but is partially a vertical section taken along the lines 3—3 of FIG. 2 in the direction of the arrows.

Received between the upper retainer 25 and the horn transverse portion 12 is the bearing assembly 22 illustrated in further detail in FIGURES 4 and 5.

The bearing assembly 22 includes a flat annular bearing plate 45 having a plurality of slots 46 therein, said slots extending radially of the axis 17 of the kingpin. The longitudinal sides 47 of the slots are formed as mutually facing recesses in order to retain the bearings 50 which are cylindrical in shape and have a diameter slightly greater than the spacing between the walls 47 of the slot at the upper surface 51 and the lower surface 52 of the bearing plate. The bearing plate 45 is formed of a suitable commercially available plastic bearing material such as, for example, that material known by the trademark Kaydon. The cylindrical roller bearings 50 are preferably composed of a hard bearing material such as a suitable form of steel. It will be appreciated that the engagement of the horn 10 and the retainer 25 with the roller bearings 50 will be a line contact rather than a point contact. Consequently, dynamic stresses exerted axially on the wheel 15 and delivered to the structure supported on the caster through the horn 10, the bearing 22 and the retainer 25 will not cause the bearings 22 to penetrate the horn and retainer to form seats resisting swiveling.

The upper end 55 of the kingpin is threaded in order that the kingpin can be secured to the supported structure which can be, for example, a grocery cart or the like.

Figure 6:
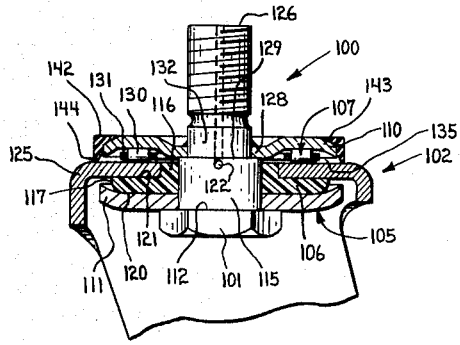
FIG. 6 is a fragmentary view similar to FIG. 2 of an alternative embodiment of the invention.

Referring now to FIG. 6, there is illustrated an alternative embodiment of the invention which includes a kingpin 100 having a hexagonal head 101. The horn 102 which has a wheel (not shown) mounted thereon in conventional manner is swivel mounted upon the kingpin 100 by the lower retainer 105, the bearing 106, the bearing assembly 107 and the upper retainer 110.

The lower retainer is generally flat and rigid similar to the retainer 20, has an annular shape with an upwardly curved periphery 111 and is supported upon a shoulder 112 which is a part of the head 101 and is contiguous with a cylindrical portion 115 of the kingpin. The lower retainer 105 surrounds the cylindrical portion 115 and supports the bearing 106 which also surrounds the cylindrical portion 115.

The bearing 106 has a shape similar to the shape of the bearing 35 in that the bearing 106 includes a collar 116 projecting upwardly from its central portion. The bearing 106, however, has an outer periphery 117 which smoothly curves from the flat lower surface 120 of the bearing 106 to the upper surface 121 thereof.

The collar 116 of the bearing 106 extends upwardly only a sufficient distance to partially cover a grease passage 122 opening through the cylindrical portion 115. In other words, the grease passage 122 has a portion which opens above the collar 116 so that grease passing out of the opening 122 can move outwardly above the collar 116 and above the horn 125 which is received upon the bearing 106 and about the collar 116. The grease passage 122 extends radially through the cylindrical portion 115 and axially upwardly therefrom to the upper end 126 of the kingpin. The bearing asembly 107 is identical to the bearing assembly 22 and includes roller bearings 130 supported within slots in a bearing plate 131. Both the bearings 130 of the bearing assembly 107 and the bearings 50 of the bearing assembly 22 have opposite sides which project from the bearing plate to engage the retainer above and the horn below.

In the embodiment of FIG. 6, the upper retainer 110 is swaged or shear-rolled at its inner periphery 128 to cause the retainer 110 to firmly grip and engage the kingpin 109 at the shoulder 129 of the kingpin and at the reduced diameter cylindrical portion 132 of the kingpin. The retainer 110 is provided with an annular downwardly opening recess 135 which provides a seat for the bearing assembly 107. In the case of the above described embodiment of FIGS. 1–5, the upper retainer 25 is provided with an annular recess 140 which is defined by the downturned outer periphery 141 of the retainer 25 and which receives and positions the bearing assembly 22.

Referring again to FIG. 6, grease supplied through the passage 122 is maintained in contact with the bearing assembly 107 and between the retainer on one side and the horn and bearing 106 on the other side by means of a grease seal 142 which is generally annular in shape and is vulcanized to the outer periphery 143 of the upper retainer 110. The grease seal 142 has a pointed lower edge 144 which engages the upper surface of the horn 102 and resists flow of grease outwardly between the horn and the retainer.

From the above description, it will be evident that the present invention provides an improved swivel-type caster arrangement which is capable of withstanding great dynamic stresses particularly when exerted axially of the swivel. It will also be evident that the present invention provides an improved caster arrangement which is particularly useful in a grocery cart which is subjected to severe jolts and jars resulting from rough usage of the cart.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a swivel-type caster arrangement a kingpin having a head on the lower end thereof and an intermediate cylindrical portion, a flat rigid annular disc received on said kingpin about said intermediate portion and bearing against said head, a flat annular plastic bearing plate received on said kingpin about said intermediate portion and supported by said disc, said plate having a raised plastic collar projecting upwardly from the central portion of said plate, a horn received above said plate and about said collar, said kingpin having a reduced diameter portion joined to said intermediate portion by a radially extending shoulder, a generally flat annular retainer swaged at its inner periphery against said shoulder and reduced diameter portion, said retainer having an annular downwardly opening recess coaxially located relative to the axis of said kingpin, a second flat annular bearing plate received between said horn and said retainer, and a plurality of cylindrical bearings received in said second bearing plate with the projected axes of said bearings intersecting the axis of said kingpin, each of said plurality of bearings having opposite sides which project from the opposite sides of said second bearing plate and which engage said horn and said retainer in line contact, said second bearing plate having a plurality of slots therein which extend radially of the axis of said kingpin, said slots having mutually facing recessed longitudinal walls which mount said bearings for rotation about the bearing axes.

2. In a swivel-type caster arrangement, a kingpin having a staked head on the lower end thereof and a first cylindrical portion contiguous with said staked head, a flat rigid annular disc received on said kingpin about said first cylindrical portion and bearing against said staked head, said kingpin having an enlarged portion above said cylindrical portion, a flat annular plastic bearing plate received on said kingpin about said enlarged portion and supported by said disc, said plate having a raised collar projecting upwardly from the central portion of said plate, a horn received above said plate and about said collar, said kingpin having a second cylindrical portion above said enlarged portion and of the same diameter as said first cylindrical portion, said enlarged portion being joined to said second cylindrical portion by a radially extending shoulder, a generally flat annular retainer resting against said shoulder and received about said second cylindrical portion, said retainer having an annular downwardly opening recess coaxially located relative to the axis of said kingpin, a further flat annular bearing plate received between said horn and said retainer, a plurality of cylindrical bearings received in said further bearing plate with the projected axes of said bearings intersecting at the axis of said kingpin, each of said plurality of bearings having opposite sides which project from the opposite sides of said further bearing plate and which engage said horn and said retainer in line contact, said further bearing plate having a plurality of slots therein which extend radially of the axis of said kingpin, said slots having mutually facing recessed longitudinal walls which mount said bearings for rotation about the bearing axes, said kingpin having a further enlarged portion adjacent and above said second cylindrical portion, said further enlarged portion being above and abutting said retainer for holding it against said first enlarged portion.

3. In a swivel-type caster arrangement, a kingpin having a staked head on the lower end thereof and a first cylindrical portion contiguous with said staked head, a flat rigid annular disc received on said kingpin about said first cylindrical portion and bearing against said staked head, said kingpin having an enlarged portion above said cylindrical portion, a flat annular plastic bearing plate received on said kingpin about said enlarged portion and supported by said disc, said plate having a raised collar projecting upwardly from the central portion of said plate, a horn received above said plate and about said collar, said kingpin having a second cylindrical portion above said enlarged portion and of the same diameter as said first cylindrical portion, said enlarged portion being joined to said second cylindrical portion by a radially extending shoulder, a generally flat annular retainer fixed against said shoulder and received about said second cylindrical portion, said retainer having an annular downwardly opening recess coaxially located relative to the axis of said kingpin, a further flat annular bearing plate received between said horn and said retainer, a plurality of cylindrical bearings received in said further bearing plate with the projected axes of said bearings intersecting at the axis of said kingpin, each of said plurality of bearings having opposite sides which project from the opposite sides of said further bearing plate and which engage said horn and said retainer in line contact, said further bearing plate having a plurality of slots therein which extend radially of the axis of said kingpin, said slots having mutually facing recessed longitudinal walls which mount said bearings for rotation about the bearing axes.

References Cited by the Examiner

UNITED STATES PATENTS

| | | | |
|---|---|---|---|
| 571,167 | 11/1896 | Lachman | 16—22 |
| 588,644 | 8/1897 | Koenig | 308—222 |
| 1,180,830 | 4/1916 | Diss | 16—22 |
| 1,346,240 | 7/1920 | Noelting | 16—22 |
| 1,604,729 | 10/1926 | Weigel | 16—21 |
| 1,995,823 | 3/1935 | Seppel | 16—21 |
| 2,090,960 | 8/1937 | Konkle | 16—21 |
| 2,914,340 | 11/1959 | Black. | |
| 2,986,746 | 6/1961 | Jackson | 16—21 |
| 2,998,617 | 9/1961 | Murphy | 16—21 |
| 3,076,668 | 2/1963 | Famely | 16—2 |

FOREIGN PATENTS

| | | |
|---|---|---|
| 564,107 | 2/1958 | Belgium. |
| 870,185 | 12/1941 | France. |
| 10,132 | 8/1885 | Great Britain. |

JOSEPH D. SEERS, *Primary Examiner.*

DONLEY J. STOCKING, *Examiner.*